United States Patent [19]

Culberton et al.

[11] Patent Number: 4,843,143

[45] Date of Patent: Jun. 27, 1989

[54] COPOLYMERIZATION OF BISOXAZOLINE AND POLYPHENOLIC COMPOUND WITH A HYDROCARBON HALIDE CATALYST

[75] Inventors: Billy M. Culberton, Worthington; Omar Tiba, Dublin, both of Ohio

[73] Assignee: Ashland Oil, Inc., Ashland, Ky.

[21] Appl. No.: 182,668

[22] Filed: Apr. 18, 1988

Related U.S. Application Data

[63] Continuation-in-part of Ser. No. 22,310, Mar. 5, 1987, abandoned.

[51] Int. Cl.$^4$ ..................... C08G 69/00; C08G 14/04
[52] U.S. Cl. .................................. 528/211; 525/504; 528/129; 528/137; 528/153; 528/154; 528/163; 528/172
[58] Field of Search ............... 528/211, 129, 137, 163, 528/172, 153, 154; 525/504

[56] References Cited

U.S. PATENT DOCUMENTS

| | | | |
|---|---|---|---|
| 4,430,491 | 2/1984 | Culbertson et al. | 528/153 |
| 4,600,766 | 7/1986 | Arita et al. | 528/207 |
| 4,613,662 | 9/1986 | Goel | 528/137 |

*Primary Examiner*—Harold D. Anderson
*Attorney, Agent, or Firm*—John F. Jones

[57] ABSTRACT

An improved process for increasing the rate of the copolymerization of mixtures of polyphenolic compounds having more than two phenolic hydroxyl groups per molecule and bis-oxazolines comprising carrying out the copolymerization in the presence of a catalytic amount of a halohydrocarbon at a temperature in the range of from about 130° C. to 150° C. is described.

8 Claims, No Drawings

COPOLYMERIZATION OF BISOXAZOLINE AND POLYPHENOLIC COMPOUND WITH A HYDROCARBON HALIDE CATALYST

This is a continuation in part of our copending U.S. patent application Ser. No. 022,310, filed Mar. 5, 1987 now abandoned.

This invention relates to the copolymerization of polyphenolic compounds such as phenolic oligomers and phenolic polymers with bis-oxazolines in the presence of a hydrocarbon halide catalysts to produce thermosetting polymers.

It is known that thermoset and thermoplastic compositions can be prepared by reacting bis-oxazolines with phenolic polymers (U.S. Pat. No. 4,430,491). This reaction requires about one hour at 175° C. followed by about 22 hours at 225° C.

We have discovered that the polymerization reaction described in U.S. Pat. No. 4,430,491 can be done at a much faster rate when a catalytic amount of a hydrocarbon halide is used in the polymerization reaction. The improved process of this invention produces faster polymerization rates, reduced gel times and reduced post-curing time.

The oxazolines useful in the practice of this invention include a variety of such compounds having at least two 2-oxazoline groups per molecule. The applicable polyfunctional oxazolines are devoid of other functional groups capable of reacting in any manner with either an oxazoline group or an aromatic hydroxyl group. From the standpoint of potential commercial availability in commodity proportions the oxazolines derived from the polycarboxylic acids are preferred. Particularly examplary of such polyacids are the aromatic acids; e.g., isophthalic acid, terephthalic acid and trimesic acid (1,3,5-benzene tricarboxylic acid), trimethyl-3-phenyl-indan-4,5-dicarboxylic acid and 2,6-naphthalene dicarboxylic acid. The indicated polyfunctional oxazoline compounds can be conveniently prepared by the reaction of aromatic dinitriles with ethanol amine or by the reaction of the corresponding esters of said polyacids and ethanolamines, followed by cyclodehydration.

Representative polyfunctional oxazoline compounds useful in the practice of this invention, particularly the bis-oxazolines, include 4,4',5,5'-tetrahydro-2,2'bisoxazole; a 2,2'-(1,4-butanediyl) bis[4,5-dihydrooxazole]; a 2,2'-(arylene) bis[4,5-dihydrooxazole], e.g., 2,2'(1,4-phenylene) bis[4,5-dihydrooxazole], 2,2'(1,3-phenylene) bis[4,5-dihydrooxazole], 2,2'-(1,5-naphthalenyl) bis[4,5-dihydrooxazole]and 2,2'-(1,8-anthracenyl) bis[4,5-dihydrooxazole]; a sulfonyl, oxy, thio or alkylene bis 2-(arylene) [4,5-dihydrooxazole], e.g., sulfonyl bis 2-(1,4-phenylene) [4,5-dihydrooxazole], oxy bis 2-(1,4-phenylene) [4,5-dihydrooxazole], thio bis 2-(1,4-phenylene) [4,5-dihydrooxazole]; a trisubstituted aromatic oxazoline, e.g., 1,3,5-tris-2,2',2"-[4,5-dihydrooxazole benzene]; a poly [2-(alkenyl) 4,5-hydrooxazole], e.g., poly[2-(2-propenyl) 4,5-dihydrooxazole], and the like.

The phenolic compounds useful in this invention are these having three or more phenolic hydroxyl groups per molecule and preferably are a variety of oligomers containing a plurality of phenolic residues. Particularly representative of such oligomers are the base or acid catalyzed phenol formaldehyde condensation products preferably the latter condensates; viz., the novolacs. Beside the conventional resoles, the phenolic resins characterized in having benzylic ether linkages prepared by metal ion catalysis such as disclosed in U.S. Pat. No. 3,485,797 are applicable. Other suitable polyphenol oligomers include the addition polymers and copolymers of a vinyl substituted phenol; e.g., 4-ethenylphenol or 4-isopropenyl phenol, and allyl and methallyl substituted phenols. Phenol-formaldehyde condensation products having three or more phenolic hydroxyl groups per molecules are most preferred.

The prior art reaction of 1,3-phenylene bisoxazoline with phenolic compounds (40:60 by weight) gives resin having a $T_g$ of 149° to 220° C. The reaction requires heating the components at 17520 C. for about 1 hour and then post curing at 225° C. for 22 hours. In accordance with the present invention, the cross-linking reaction is carried out in the presence of a catalyst such as a monohalohydrocarbon or a polyhalohydrocarbon resulting in much improved rates of polymerization and shorter gel times result. Hydrocarbon halides useful as catalysts in this invention include butyl bromide, butyl chloride, butyl iodide, t-butyl bromide, t-butyl chloride, lauryl bromide, benzyl bromide, alpha, alpha'-dibromoxylene, alpha, alpha'dichloroxylene, alpha-bromopropionic acid, alpha-bromobutyric acid, 1-bromo, 4-chlorobutane, 2,3-dibromopropanol, and the like and others.

The halohydrocarbons useful in this invention include those conforming to at least one of formulas I and II

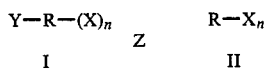

$$Y-R-(X)_n \qquad R-X_n$$
$$\phantom{Y-R-(X)_n}Z$$
$$\text{I} \qquad\qquad \text{II}$$

wherein Y represents an aryl, arylene, substituted aryl or arylene group having from 6 to 18 carbon atoms and wherein the substituent can be halogen, cyano, carboxylic acid, carboxylic acid ester or hydroxyl groups, R represents an aliphatic group having from 1 to 20 carbon atoms or a cycloaliphatic group having from 3 to 20 carbon atoms and wherein R can contain as substituents nitro, hydroxyl, mercapto, carboxylic acid or carboxylic acid ester groups, X represents a halogen group selected from chlorine, bromine and iodine, n represents a number of from 1 to 3 and Z represents a number of from 1 to 3.

The catalyst is used in amounts of from about 0.1 to 5% by weight based on the weight of the polymerization mixture. In the polymerization reaction both the bis-oxazoline and the polyphenolic compound can be melted separately and mixed in the melt or they can be mixed as solids and then melted together. The catalyst can be introduced into the reactants at any stage of the heating process. The reaction temperature for the polymerization process can be in the range of from 130° C. to 250° C. depending on the reactants used and the catalyst employed. The reaction time will vary depending on the nature of the reactants and catalyst as well as the temperature of the reaction.

The process of this invention requires the use of a molar ratio of the phenol-formaldehyde condensation product to bisoxazoline of more than 2.

The polymers produced by the process of this invention are useful in high performance plastic composite structures, molding resins, high temperature resistant adhesives, reinforced plastic structures and the like.

The invention is further illustrated in the following representative examples.

EXAMPLE 1

A mixture of 1,3-phenylene bisoxazoline (1,3-PBOX) (4 g 0.19 Mole) and 6g (0.56 Mole) of phenol-free phenol-formaldehyde condensation novolac (American Hoechst Alnovol PN 320) was heated at 160° C. using 0.1g (1%) of benzyl chloride as catalyst and the mixture gelled in 10.5 minutes. Post curing of the mixture at 160° C. for 0.5 hours gave a thermoset polymer having a $T_g$ by DSC of 133.5° C. When the catalyst was increased to 3% the gel time was reduced to 5 minutes and post curing at 160° C. for 0.5 hour gave a thermoset polymer having a $T_g$ of 160° C. This demonstrates a decided improvement over the prior art (see example 12 in U.S. Pat. No. 4,430,491).

EXAMPLES 2-7

The procedure of Example 1 was followed using various alkyl halide catalysts and the results obtained are given in the following Table.

| Example | Catalyst | Catalyst Conc | Gel Time (min) | $T_g$ °C. |
|---|---|---|---|---|
| 2 | alpha,alpha'-dibromo-p-xylene | 1% | 6.5 | 134.3 |
| 3 | alpha,alpha'-dibromo-p-xylene | 3% | 1.5 | 155.5 |
| 4 | alpha,alpha'-dichloro-p-xylene | 1% | 7.5 | 142 |
| 5 | alpha,alpha'-dichloro-p-xylene | 3% | 3 | 152.5 |
| 6 | 1-bromo-4-chlorobutane | 1% | 6.5 | 139.5 |
| 7 | 1-bromo-4-chlorobutane | 3% | 5 | 157.2 |

EXAMPLE 8

When the procedures of Examples 1-7 were repeated using 5 g (0.23 mole) of 1,3-PBOX and 5 g (0.23 mole) of Alnovol PN 320 thermoset polymers were produced in similar gel times and the resulting thermoset polymers had properties similar to those given in Examples 1-7.

EXAMPLE 9

When the procedures of Examples 1-7 were repeated using 3 g (0.14 mole) of 1,3-PBOX and 7 g (0.66 mole) of Alnovol PN 320 thermoset polymers were produced in similar gel times and the resulting thermoset polymers had properties similar to those given in Examples 1-7.

We claim:

1. A process comprising copolymerizing a polyphenolic compound having more than two hydroxyl groups per molecule with a bis-oxazoline at a temperature in the range of from about 130° to 250° C. in the presence of a catalytic amount of a halohydrocarbon catalyst.

2. The process of claim 1 wherein the halohydrocarbon is at least one of formulas I or II

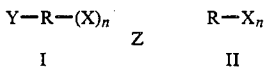

wherein Y represents an aryl or arylene group having from 6 to 18 carbon atoms and or said aryl or arylene group substituted with a halogen, cyano, carboxylic acid, carboxylic acid ester or hydroxyl group, R represents an aliphatic group having from 1 to 20 carbon atoms or a cycloaliphatic group having from 3 to 20 carbon atoms or said R groups containing as substituents nitro, hydroxyl mercapto, carboxylic acid or carboxylic acid ester groups, X represents a halogen group selected from chlorine, bromine or iodine, n represents a number of from 1 to 3 and Z represents a number of from 1 to 3.

3. The process of claim 2 wherein the catalyst is present in from 0.1 to 5% by weight based on the combined weight of the combined polyphenolic compound-bis-oxazoline.

4. The process of claim 3 wherein the polyphenolic compound is a phenol-formaldehyde condensation product.

5. The process of claim 4 wherein the bis-oxazoline compound is one having at least two 2-oxazoline groups per molecule.

6. The process of claim 5 wherein the bis-oxazoline is 1,3-phenylene bis-oxazoline.

7. The process of claim 6 wherein the halohydrocarbon is alpha, alpha-dibromo-p-xylene.

8. The process of claim 7 wherein the halohydrocarbon is 1-bromo-4-chlorobutane.

* * * * *